United States Patent
Belelie et al.

(10) Patent No.: US 9,133,354 B2
(45) Date of Patent: Sep. 15, 2015

(54) CURABLE AQUEOUS LATEX INKS FOR INDIRECT PRINTING

(71) Applicant: XEROX CORPORATION, Norwalk, CT (US)

(72) Inventors: Jennifer L. Belelie, Oakville (CA); Michelle N. Chrétien, Oakville (CA); Daryl W. Vanbesien, Burlington (CA); Jenny Eliyahu, Maple (CA); Barkev Keoshkerian, Thornhill (CA); Naveen Chopra, Oakville (CA)

(73) Assignee: XEROX CORPORATION, Norwalk, CT (US)

( * ) Notice: Subject to any disclaimer, the term of this patent is extended or adjusted under 35 U.S.C. 154(b) by 44 days.

(21) Appl. No.: 14/067,152

(22) Filed: Oct. 30, 2013

(65) Prior Publication Data

US 2015/0119486 A1   Apr. 30, 2015

(51) Int. Cl.

| C08F 2/46 | (2006.01) |
|---|---|
| C08F 2/50 | (2006.01) |
| B29C 71/04 | (2006.01) |
| C08G 61/04 | (2006.01) |
| C09D 11/104 | (2014.01) |
| C09D 11/30 | (2014.01) |
| C09D 11/107 | (2014.01) |

(52) U.S. Cl.
CPC ............ *C09D 11/104* (2013.01); *C09D 11/107* (2013.01); *C09D 11/30* (2013.01)

(58) Field of Classification Search
USPC ......... 522/18, 12, 7, 6, 71, 189, 184, 1, 8, 13, 522/21, 22; 520/1
See application file for complete search history.

(56) References Cited

U.S. PATENT DOCUMENTS

| 5,389,958 | A | 2/1995 | Bui |
|---|---|---|---|
| 6,063,827 | A | 5/2000 | Sacripante |
| 6,593,049 | B1 | 7/2003 | Veregin |
| 6,756,176 | B2 | 6/2004 | Stegamat |
| 6,830,860 | B2 | 12/2004 | Sacripante |
| 7,270,408 | B2 | 9/2007 | Odell |
| 7,690,782 | B2 | 4/2010 | Odell |
| 2006/0166122 | A1* | 7/2006 | Patel et al. .................. 430/110.2 |
| 2010/0080913 | A1* | 4/2010 | Irita .............................. 427/258 |
| 2011/0086301 | A1* | 4/2011 | Cheng et al. .................. 430/105 |
| 2014/0204162 | A1* | 7/2014 | Keoshkerian et al. ........ 347/103 |

OTHER PUBLICATIONS

U.S. Appl. No. 14/067,469, filed Oct. 30, 2013, entitled "Inkjet Ink Containing Polystyrene Copolymer Latex Suitable for Indirect Printing"; First Inventor: Jenny Eliyahu.
U.S. Appl. No. 14/067,074, filed Oct. 30, 2013, entitled "Electron Beam Curable Inks for Indirect Printing"; First Inventor: Michelle N. Chretien.
U.S. Appl. No. 14/067,054, filed Oct. 30, 2013, entitled Photocurable Inks for Indirect Printing; First Inventor: Michelle N. Chretien.
U.S. Appl. No. 14/067,191, filed Oct. 30, 2013, entitled "Curable Latex Inks Comprising an Unsaturated Polyester for Indirect Printing"; First Inventor: Jennifer L. Belelie.
U.S. Appl. No. 14/067,240, filed Oct. 30, 2013, entitled "Emulsified Aqueous Ink Comprising Reactive Alkoxysilane for Indirect Printing"; First Inventor: Naveen Chopra.
U.S. Appl. No. 14/067,290, filed Oct. 30, 2013, entitled "Dual Component Inks Comprising Reactive Latexes for Indirect Printing"; First Inventor: Naveen Chopra.
U.S. Appl. No. 14/067,325, filed Oct. 30, 2013, entitled "Emulsified Curable Inks for Indirect Printing"; First Inventor: Daryl W. Vanbesien.
U.S. Appl. No. 14/067,443, filed Oct. 30, 2013, entitled "Emulsified Electrorheological Inks for Indirect Printing"; First Inventor: Naveen Chopra.
U.S. Appl. No. 14/066,716, filed Oct. 30, 2013, entitled "Ink Jet Ink for Indirect Printing Applications"; First Inventor: Jenny Eliyahu.

* cited by examiner

*Primary Examiner* — Ling Choi
*Assistant Examiner* — Jessica E Whiteley
(74) *Attorney, Agent, or Firm* — Pillsbury Winthrop Shaw Pittman LLP

(57) ABSTRACT

The present disclosure provides a curable aqueous latex ink comprising a curable material, a photoinitiator and a polyester polymer, which is suitable for use in an indirect printing method.

13 Claims, 1 Drawing Sheet

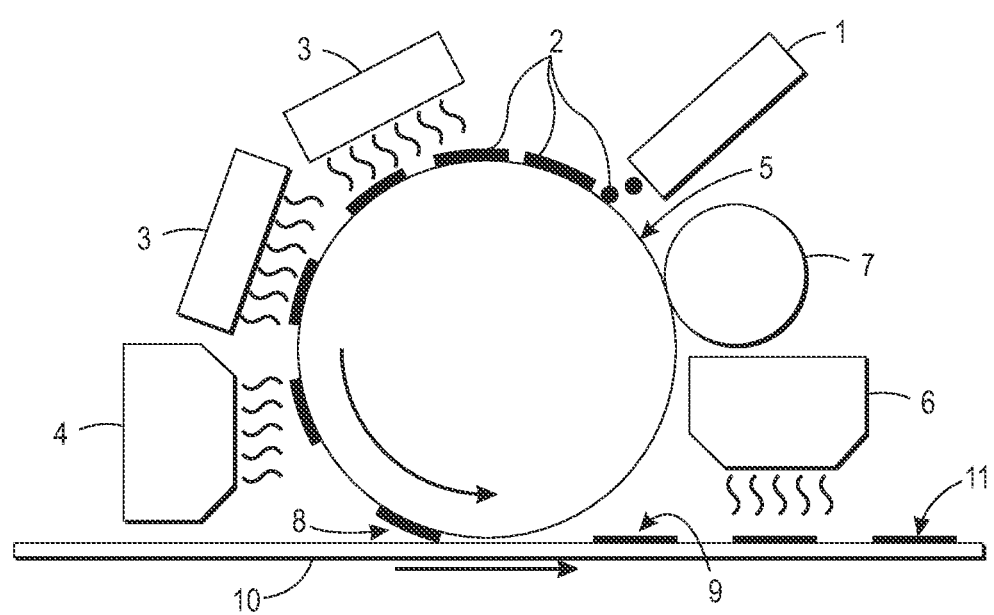

CURABLE AQUEOUS LATEX INKS FOR INDIRECT PRINTING

CROSS-REFERENCE TO RELATED APPLICATIONS

This application is related to co-pending and co-owned U.S. patent application Ser. No. 14/067,469, entitled "INKJET INK CONTAINING POLYSTYRENE COPOLYMER LATEX SUITABLE FOR INDIRECT PRINTING", filed herewith, U.S. patent application Ser. No. 14/067,191, entitled "CURABLE LATEX INKS COMPRISING AN UNSATURATED POLYESTER FOR INDIRECT PRINTING", filed herewith, and U.S. patent application Ser. No. 14/067,325, entitled "EMULSIFIED UV CURABLE INKS FOR INDIRECT PRINTING", filed herewith, each of the foregoing being incorporated herein by reference in its entirety.

INTRODUCTION

The presently disclosed embodiments are related generally to curable aqueous latex ink compositions for indirect printing method.

Indirect printing process is a two-step printing process wherein the ink is first applied imagewise onto an intermediate receiving member (drum, belt, etc.) using an inkjet printhead. The ink wets and spreads onto the intermediate receiving member to form a transient image. The transient image then undergoes a change in properties (e.g., partial or complete drying, thermal or photo-curing, gelation etc.) and the resulting transient image is then transferred to the substrate.

Inks suitable for such indirect printing process must be designed and optimized to be compatible with the different subsystems, such as, jetting, transfer, etc., that enable high quality printing at high speed. Typically, inks that display good wettability do not transfer onto a substrate, or conversely inks that transfer efficiently to the substrate do not wet the intermediate receiving member. To date, there is no commercially available ink that enables both the wetting and the transfer functions.

Thus, there exists a need to develop an ink suitable for indirect printing process, and particularly, there exists a need to develop an ink that exhibits good wetting of the intermediate receiving member and is capable of efficient transfer to the final substrate.

Each of the foregoing U.S. patents and patent publications are incorporated by reference herein. Further, the appropriate components and process aspects of the each of the foregoing U.S. patents and patent publications may be selected for the present disclosure in embodiments thereof.

SUMMARY

According to embodiments illustrated herein, there is provided a curable aqueous latex ink for use in an indirect printing process comprising a curable material; a photoinitiator; and a polymer, wherein the polymer has a softening temperature of from about 40° C. to less than 105° C., and a glass transition temperature of from about 40° C. to about 150° C.

In embodiments, the present disclosure provides a curable aqueous latex ink for use in an indirect printing process comprising a curable material; a photoinitiator; and a polymer having a glass transition point of from about 40° C. to about 150° C.; wherein the ink has a surface tension of from about 15 to about 50 dynes/cm at the jetting temperature.

In further embodiments, there is provided a curable aqueous latex ink for use in an indirect printing process comprising a curable material selected from the group consisting of methacrylate monomer, acrylate monomer, dimethacrylate monomer, diacrylate monomer, triacrylate monomer, diacrylate oligomer, polyester acrylate oligomer, and mixtures thereof; a photoinitiator; and a polymer having a glass transition point of from about 40° C. to about 150° C.; wherein the ink has a surface tension of from about 15 to about 50 dynes/cm at the jetting temperature, and has a viscosity of from about 2 centipoise to about 20 centipoise at the jetting temperature.

BRIEF DESCRIPTION OF THE DRAWINGS

For a better understanding of the present embodiments, reference may be made to the accompanying figures.

FIG. 1 is a diagrammatical illustration of an imaging member in accordance with the present embodiments for applying a two-step transfer and curing process in an indirect printing system.

DETAILED DESCRIPTION

In the following description, it is understood that other embodiments may be utilized and structural and operational changes may be made without departure from the scope of the present embodiments disclosed herein.

In this specification and the claims that follow, singular forms such as "a," "an," and "the" include plural forms unless the content clearly dictates otherwise. All ranges disclosed herein include, unless specifically indicated, all endpoints and intermediate values. In addition, reference may be made to a number of terms that shall be defined as follows:

The term "curable" describes, for example, a material that may be cured via polymerization, including for example free radical routes, and/or in which polymerization is photoinitiated though use of a radiation-sensitive photoinitiator. The term "radiation-curable" refers, for example, to all forms of curing upon exposure to a radiation source, including light and heat sources and including in the presence or absence of initiators. Exemplary radiation-curing techniques include, but are not limited to, curing using ultraviolet (UV) light, for example having a wavelength of 200-400 nm or more rarely visible light, optionally in the presence of photoinitiators and/or sensitizers, curing using electron-beam radiation, optionally in the absence of photoinitiators, curing using thermal curing, in the presence or absence of high-temperature thermal initiators (and which may be largely inactive at the jetting temperature), and appropriate combinations thereof.

As used herein, the term "viscosity" refers to a complex viscosity, which is the typical measurement provided by a mechanical rheometer that is capable of subjecting a sample to a steady shear strain or a small amplitude sinusoidal deformation. In this type of instrument, the shear strain is applied by the operator to the motor and the sample deformation (torque) is measured by the transducer. Examples of such instruments are the Rheometrics Fluid Rheometer RFS3 or the ARES rheometer, both made by Rheometrics, a division of TA Instruments. The invention discloses a curable aqueous latex ink which is suitable for an indirect print process, or indirect printing inkjet applications. The curable aqueous ink of the present embodiments may possess the required surface tension (in the range of 15-50 mN/m), viscosity (in the range of 3-20 cps), and particle size (<600 nm) for use in an inkjet (e.g., piezoelectric) printhead.

In embodiments, the curable aqueous ink has a surface tension of from about 15 mN/m to about 50 mN/m, for example from about 18 mN/m to about 40 mN/m, or from about 20 mN/m to about 30 mN/m at the jetting temperature.

In embodiments, the curable aqueous latex ink has a viscosity of from about 2 cps to about 20 cps, for example from about 3 cps to about 15 cps, or from about 4 cps to about 12 cps, at the jetting temperature. In particular embodiments, the ink compositions are jetted at temperatures of less than about 70° C., such as from about 25° C. to about 70° C., or from about 30° C. to about 50° C., such as from about 30° C. to about 40° C.

In embodiments, the curable aqueous latex ink has an average pigment particle size of less than about 600 nm, for example from about 25 nm to about 500 nm, or from about 50 nm to about 300 nm.

FIG. 1 discloses a diagrammatical illustration of an imaging system in accordance with the present embodiments for applying a two-step transfer and curing process whereby an ink of the present disclosure is printed onto an intermediate transfer surface for subsequent transfer to a receiving substrate. During the indirect print process, the ink of the present embodiments is jetted and spread onto an intermediate receiving member 5 via an inkjet printhead 1. The intermediate receiving member 5 may be provided in the form of a drum, as shown in FIG. 1, but may also be provided as a web, platen, belt, band or any other suitable design.

Referring again to FIG. 1, the intermediate receiving member 5 may be heated by a heater device 3 to remove the water content (partially or fully) in the ink vehicle of ink 2, and induce film formation by the residual ink which includes polymer and curable materials (e.g., monomers/oligomers). The residual ink is optionally partially cured (pre-cured) by UV radiation source 4 to reduce film splitting prior to the transfer of the ink image 8. The ink image 8 is then transferred from the intermediate receiving member 5 to the final receiving substrate 10. The transfer of the ink image may be performed through contact under pressure, and/or near the softening point of the polymer. The transferred image 9 is then further subjected to UV irradiation 6 to induce complete crosslinking thereby resulting in a robust image 11. Image robustness is especially important for packaging applications such as folding carton, for example.

It is important to note that an ink suitable for an indirect printing process must be able to wet the intermediate receiving member 5 to enable formation of the transient image 2, and undergo a stimulus-induced property change to enable release from the intermediate receiving member 5 in the transfer step.

Latexes

Latexes generally comprise a stable dispersion (or emulsion) of polymer microparticles in an aqueous medium. The curable aqueous latex ink of the present embodiments may include one or more polymers. Suitable polymers may include one or more amorphous resins, crystalline resins, and mixtures thereof. In embodiments, the polymer includes an amorphous polyester, a crystalline polyester, or mixtures thereof. In embodiments, the latex comprises an aqueous dispersion of polyester.

The latex can comprise any suitable or desired polymer material. Any suitable or desired polyester can be used for the ink compositions herein. In embodiments, the polyester can be a material described in U.S. Pat. No. 6,593,049 and U.S. Pat. No. 6,756,176, which are each hereby incorporated by reference herein in their entireties. Suitable resins can also include a mixture of an amorphous polyester resin and a crystalline polyester resin as described in U.S. Pat. No. 6,830,860, which is hereby incorporated by reference herein in its entirety.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. In embodiments, an unsaturated, amorphous polyester resin may be utilized as a latex resin. Examples of such resins include those disclosed in U.S. Pat. No. 6,063,827. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof. In embodiments, the amorphous resin utilized in the core may be linear. In embodiments, a suitable amorphous polyester resin may be a poly(propoxylated bisphenol A co-fumarate) resin having the following formula (I):

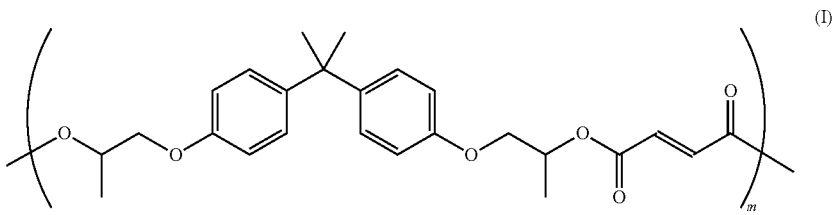

wherein m may be from about 5 to about 1000. Examples of such resins and processes for their production include those disclosed in U.S. Pat. No. 6,063,827.

In embodiments, suitable crystalline resins include any of the various crystalline polyesters, such as poly(ethylene-adipate), poly(propylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), copoly(5-sulfoisophthaloyl)-copoly(ethylene-adipate), copoly(5-sulfoisophthaloyl)-copoly(propylene-adipate), copoly(5-sulfoisophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), copoly(5-sulfo-isophthaloyl)-copoly(octylene-adipate), copoly(5-sulfoisophthaloyl)-copoly(ethylene-succinate), copoly(5-sulfoisophthaloyl)-copoly(propylene-succinate), copoly(5-sulfoisophthaloyl)-copoly(butylene-succinate), copoly(5-sulfoisophthaloyl)-copoly(pentylene-succinate), copoly(5-sulfoisophthaloyl)-copoly(hexylene-succinate), copoly(5-sulfoisophthaloyl)-copoly(octylene-succinate), copoly(5-sulfoisophthaloyl)-copoly(ethylene-sebacate), copoly(5-sulfo-isophthaloyl)-copoly(propylene-sebacate), copoly(5-sulfo-isophthaloyl)-copoly(butylenes-sebacate), copoly(5-sulfo-isophthaloyl)-copoly(pentylene-sebacate), copoly(5-sulfo-isophthaloyl)-copoly(hexylene-sebacate), copoly(5-sulfo-isophthaloyl)-copoly(octylene-sebacate), copoly(5-sulfo-isophthaloyl)-copoly(ethylene-adipate), copoly(5-sulfo-isophthaloyl)-copoly(propylene-adipate), copoly(5-sulfo-isophthaloyl)-copoly(butylene-adipate), copoly(5-sulfo-isophthaloyl)-copoly(pentylene-adipate), copoly(5-sulfo-isophthaloyl)-copoly(hexylene-adipate), and poly(octylene-adipate).

In one embodiment, the polymers include poly(co-propoxylated bisphenol co-terephthalate co-fumarate amorphous polyester resin, poly(1,9-nonanediol-co-dodecanedioic acid) crystalline polyester, and mixtures thereof.

The typical properties of the amorphous polyester and the crystalline polyester are listed below.

| Resins | Composition | Mw (g/mol) | Mn (g/mol) | PD | Acid number | Mp (° C.) | Tg onset (° C.) |
|---|---|---|---|---|---|---|---|
| Amorphous | poly(co-propoxylated bisphenol co-terephthalate co-fumarate polyester resin | 19,388 | 5,003 | 3.88 | 14.71 | — | 60.5 |
| Crystalline | poly(1,9-nonanediol-co-dodecanedioic acid) | 23,337 | 10,570 | 2.21 | 9.06 | 71 | |

In embodiments, the polymer includes an amorphous resin, e.g., an amorphous polyester.

In embodiments, the polymer includes a crystalline resin, e.g., a crystalline polyester. The crystalline resin may possess various melting points, for example, from about 30° C. to about 120° C., from about 50° C. to about 90° C., or from about 60° C. to less than about 80° C.

In embodiments, the polymer includes both an amorphous polyester and a crystalline polyester.

The amorphous polymer may have a softening temperature of from about 40° C. to less than 105° C., 50° C. to less than 105° C., from about 60° C. to less than 105° C., or from about 70° C. to less than 105° C.

The amorphous polymer may have a glass transition temperature of from about 40° C. to about 150° C., from about 45° C. to about 100° C., from about 45° C. to about 90° C., from about 60° C. to about 120° C., or from about 70° C. to about 110° C.

The polymer of the present embodiments may have an acid value in the range of from about 8 to about 25, from about 10 to about 22, from about 14 to about 17, from about 9 to about 13.

The polymer may have a weight average molecular weight (Mw) of from about 5,000 g/mol to about 40,000 g/mol, in embodiments from about 15,000 g/mol to about 30,000 g/mol, or from about 18,000 g/mol to about 25,000 g/mol.

The polymer may have a volume average particle diameter of from about 50 to about 600 nm, from about 50 to about 500 nm, or from about 50 to about 300 nm.

The total amount of polymer included in the ink composition may be from, for example, from about 1 percent to about 20 percent, such as from about 1 percent to about 15 percent, or from about 1 percent to about 10 percent by weight of the ink composition.

The ink compositions herein can consist solely of water, or can comprise a mixture of water and a water soluble or water miscible organic component, referred to as a co-solvent, humectant, or the like (hereinafter co-solvent) such as alcohols and alcohol derivatives, including aliphatic alcohols, aromatic alcohols, diols, glycol ethers, polyglycol ethers, long chain alcohols, primary aliphatic alcohols, secondary aliphatic alcohols, 1,2-alcohols, 1,3-alcohols, 1,5-alcohols, ethylene glycol alkyl ethers, propylene glycol alkyl ethers, methoxylated glycerol, ethoxylated glycerol, higher homologues of polyethylene glycol alkyl ethers, and the like, with specific examples including ethylene glycol, propylene glycol, diethylene glycols, glycerine, dipropylene glycols, polyethylene glycols, polypropylene glycols, trimethylolpropane, 1,5-pentanediol, 2-methyl-1,3,-propanediol, 2-ethyl-2-hydroxymethyl-1,3-propanediol, 3-methoxybutanol, 3-methyl-1,5-pentanediol, 1,3-propanediol, 1,4-butanediol, 2,4-heptanediol, and the like; also suitable are amides, ethers, urea, substituted ureas such as thiourea, ethylene urea, alkylurea, alkylthiourea, dialkylurea, and dialkylthiourea, carboxylic acids and their salts, such as 2-methylpentanoic acid, 2-ethyl-3-propylacrylic acid, 2-ethyl-hexanoic acid, 3-ethoxypropionic, acid, and the like, esters, organosulfides, organosulfoxides, sulfones (such as sulfolane), carbitol, butyl carbitol, cellusolve, ethers, tripropylene glycol monomethyl ether, ether derivatives, hydroxyethers, amino alcohols, ketones, N-methylpyrrolidinone, 2-pyrrolidinone, cyclohexylpyrrolidone, amides, sulfoxides, lactones, polyelectrolytes, methyl sulfonylethanol, imidazole, 1,3-dimethyl-2-imidazolidinone, betaine, sugars, such as 1-deoxy-D-galactitol, mannitol, inositol, and the like, substituted and unsubstituted formamides, substituted and unsubstituted acetamides, and other water soluble or water miscible materials, as well as mixtures thereof. In embodiments, the co-solvent is selected from the group consisting of ethylene glycol, N-methylpyrrolidinone, methoxylated glycerol, ethoxylated glycerol, and mixtures thereof. When mixtures of water and water soluble or miscible organic liquids are selected as the liquid vehicle, the water to organic ratio ranges can be any suitable or desired ration, in embodiments from about 100:0 to about 30:70, or from about 97:3 to about 40:60, or from about 95:5 to about 60:40. The non-water component of the liquid vehicle generally serves as a humectant or co-solvent which has a boiling point higher than that of water (100° C.). The organic component of the ink vehicle can also serve to modify ink surface tension, modify ink viscosity, dissolve or disperse the colorant, and/or affect the drying characteristics of the ink.

In certain embodiments, the co-solvent is selected from the group consisting of sulfolane, methyl ethyl ketone, isopropanol, 2-pyrrolidinone, polyethylene glycol, and mixtures thereof.

The total amount of liquid vehicle can be provided in any suitable or desired amount. In embodiments, the liquid vehicle is present in the curable aqueous latex ink composition in an amount of from about 75 to about 97 percent, or from about 80 to about 95 percent, or from about 85 to about 95 percent, by weight, based on the total weight of the ink.

Curable Material

Curable material includes curable monomers, curable oligomers, and mixtures thereof. In embodiments, the curable monomer is selected from the group consisting of methacrylate monomer, acrylate monomer, dimethacrylate monomer, diacrylate monomer, triacrylate monomer, and mixtures thereof. In embodiments, the curable oligomer is selected from the group consisting of diacrylate oligomer, polyester acrylate oligomer, and mixtures thereof.

In embodiments, the curable aqueous latex ink includes water soluble curable components. Examples of curable components include any suitable curable monomer, and/or oligomer that are soluble in water. Examples of water soluble curable components include curable monomer compounds, such as acrylate and methacrylate monomer compounds. In embodiments, the at least one monomer or oligomer is a monofunctional acrylate monomer, a multifunctional acrylate monomer, a monofunctional methacrylate monomer, a multifunctional methacrylate monomer, or mixtures thereof.

Specific examples of water soluble curable acrylate and methacrylate monomers include, for example, methoxy polyethylene glycol (550) monomethacrylate (CD552®), methoxy polyethylene glycol (550) monoacrylate (CD553®), polyethylene glycol (600) dimethacrylate (SR252®), Polyethylene glycol 400 diacrylate (SR344®), ethoxylated (20) trimethylolpropane triacrylate (SR415®), methoxy polyethylene glycol (350) monomethacyrlate monomer (SR550®), methoxy polyethylene glycol (350) monomer (SR551®), polyethylene glycol (600) diacrylate (SR610®), ethoxylated (15) trimethylolpropane triacrylate (SR9035®) and the like, as well as mixtures thereof. All of the monomers disclosed above are commercially available from Sartomer Co. Inc.

Specific examples of water soluble curable acrylate and methacrylate oligomers include, for example, low viscosity aliphatic diacrylate oligomer (CN132®) (slightly soluble), polyester acrylate oligomer (CN2255®), polyester acrylate oligomer (CN2256®), and the like, as well as mixtures thereof. All of the oligomers disclosed above are commercially available from Sartomer Co. Inc.

The monomer, oligomer, or mixtures thereof, can be present in any suitable amount. In embodiments, the monomer, oligomer, or mixtures thereof is present in an amount of from about 1 to about 30%, from about 1 to about 20%, or from about 1 to about 10%, by weight based on the total weight of the curable aqueous latex ink.

Photoinitiators

The curable aqueous latex ink of the present embodiments may include photoinitiators that are compatible with water-based ink formulations (can be soluble or insoluble in water). In embodiments, the photoinitiators include benzophenone, hydroxyketone (e.g., alpha-hydroxyketones), acylphosphine oxides, phenylglyoxylates, and mixtures thereof. Specific examples of photoinitiators include a 1:1 mixture of 1-hydroxy-cyclohexyl-phenyl-ketone and benzophenone (Irgacure® 500); methylbenzoylformate (Darocur MBF); ethyl-2,4,6-trimethylbenzoylphenylphosphinate (Lucirin® TPO-L); a liquid blend of acylphosphine oxides (Irgacure® 2100); phosphine oxide, phenyl bis(2,4,6-trimethyl benzoyl) (45% active, dispersed in $H_2O$, Irgacure® 819-DW) and a stable water emulsion based on 32% active photoinitiators 2,4,6-trimethylbenzoyldiphenylphospine oxide, alpha-hydroxyketones, benzophenone (Esacure DP250); and mixtures thereof.

In embodiments, the photoinitiator may absorb radiation of about 200 nm to about 420 nm wavelengths in order to initiate cure, although use of initiators that absorb at longer wavelengths can also be used without restriction.

The total amount of initiator included in the ink composition may be from, for example, from about 1 percent to about 20 percent, such as from about 3 percent to about 15 percent, or from about 4 percent to about 10 percent by weight of the ink composition.

Colorants

In embodiments, the colorant may include a pigment, a dye, combinations thereof, black, cyan, magenta, yellow, red, green, blue, brown, combinations thereof, in an amount sufficient to impart the desired color to the ink.

The colorant may be provided in the form of a colorant dispersion. In embodiments, the colorant dispersion has an average particle size of from about 20 to about 500 nanometers (nm), or from about 20 to about 400 nm, or from about 30 to about 300 nm. In embodiments, the colorant is selected from the group consisting of dyes, pigments, and combinations thereof, and optionally, the colorant is a dispersion comprising a colorant, an optional surfactant, and an optional dispersant.

As noted, any suitable or desired colorant can be selected in embodiments herein. The colorant can be a dye, a pigment, or a mixture thereof. Examples of suitable dyes include anionic dyes, cationic dyes, nonionic dyes, zwitterionic dyes, and the like. Specific examples of suitable dyes include Food dyes such as Food Black No. 1, Food Black No. 2, Food Red No. 40, Food Blue No. 1, Food Yellow No. 7, and the like, FD & C dyes, Acid Black dyes (No. 1, 7, 9, 24, 26, 48, 52, 58, 60, 61, 63, 92, 107, 109, 118, 119, 131, 140, 155, 156, 172, 194, and the like), Acid Red dyes (No. 1, 8, 32, 35, 37, 52, 57, 92, 115, 119, 154, 249, 254, 256, and the like), Acid Blue dyes (No. 1, 7, 9, 25, 40, 45, 62, 78, 80, 92, 102, 104, 113, 117, 127, 158, 175, 183, 193, 209, and the like), Acid Yellow dyes (No. 3, 7, 17, 19, 23, 25, 29, 38, 42, 49, 59, 61, 72, 73, 114, 128, 151, and the like), Direct Black dyes (No. 4, 14, 17, 22, 27, 38, 51, 112, 117, 154, 168, and the like), Direct Blue dyes (No. 1, 6, 8, 14, 15, 25, 71, 76, 78, 80, 86, 90, 106, 108, 123, 163, 165, 199, 226, and the like), Direct Red dyes (No. 1, 2, 16, 23, 24, 28, 39, 62, 72, 236, and the like), Direct Yellow dyes (No. 4, 11, 12, 27, 28, 33, 34, 39, 50, 58, 86, 100, 106, 107, 118, 127, 132, 142, 157, and the like), Reactive Dyes, such as Reactive Red Dyes (No. 4, 31, 56, 180, and the like), Reactive Black dyes (No. 31 and the like), Reactive Yellow dyes (No. 37 and the like); anthraquinone dyes, monoazo dyes, disazo dyes, phthalocyanine derivatives, including various phthalocyanine sulfonate salts, aza(18)annulenes, formazan copper complexes, triphenodioxazines, and the like; and the like, as well as mixtures thereof.

Examples of suitable pigments include black pigments, white pigments, cyan pigments, magenta pigments, yellow pigments, or the like. Further, pigments can be organic or inorganic particles. Suitable inorganic pigments include carbon black. However, other inorganic pigments may be suitable such as titanium oxide, cobalt blue ($CoO$—$Al_2O_3$), chrome yellow ($PbCrO_4$), and iron oxide. Suitable organic pigments include, for example, azo pigments including diazo pigments and monoazo pigments, polycyclic pigments (e.g., phthalocyanine pigments such as phthalocyanine blues and phthalocyanine greens), perylene pigments, perinone pigments, anthraquinone pigments, quinacridone pigments, dioxazine pigments, thioindigo pigments, isoindolinone pigments, pyranthrone pigments, and quinophthalone pigments), insoluble dye chelates (e.g., basic dye type chelates and acidic dye type chelate), nitro pigments, nitroso pigments, anthanthrone pigments such as PR168, and the like. Representative examples of phthalocyanine blues and greens include copper phthalocyanine blue, copper phthalocyanine green, and derivatives thereof (Pigment Blue 15, Pigment Green 7, and Pigment Green 36). Representative examples of quinacridones include Pigment Orange 48, Pigment Orange 49, Pigment Red 122, Pigment Red 192, Pigment Red 202, Pigment Red 206, Pigment Red 207, Pigment Red 209, Pigment Violet 19, and Pigment Violet 42. Representative examples of anthraquinones include Pigment Red 43, Pigment Red 194, Pigment Red 177, Pigment Red 216 and Pigment Red 226. Representative examples of perylenes include Pigment Red 123, Pigment Red 149, Pigment Red 179, Pigment Red 190, Pigment Red 189 and Pigment Red 224. Representative examples of thioindigoids include Pigment Red 86, Pigment Red 87, Pigment Red 88, Pigment Red 181, Pigment Red 198, Pigment Violet 36, and Pigment Violet 38. Representative examples of heterocyclic yellows include Pigment Yellow 1, Pigment Yellow 3, Pigment Yellow 12, Pigment Yellow 13, Pigment Yellow 14, Pigment Yellow 17, Pigment Yellow 65, Pigment Yellow 73, Pigment Yellow 74, Pigment Yellow 90, Pigment Yellow 110, Pigment Yellow 117, Pigment Yellow 120, Pigment Yellow 128, Pigment Yellow 138, Pigment Yellow 150, Pigment Yellow 151, Pigment Yellow 155, and Pigment Yellow 213. Such pigments are commercially available in either powder or press cake form from a number of sources including, BASF Corporation, Engelhard Corporation, and Sun Chemical Corporation. Examples of black pigments that may be used include carbon pigments. The carbon pigment can be almost any commercially available carbon pigment that provides acceptable optical density and print characteristics. Carbon pigments suitable for use in the present system and method include, without limitation, carbon black, graphite, vitreous carbon, charcoal, and combinations thereof. Such carbon pigments can be manufactured by a variety of known methods, such as a channel method, a contact method, a furnace method, an acetylene method, or a thermal method, and are commercially available from such vendors as Cabot Corporation, Columbian Chemicals Company, Evonik, and E.I. DuPont de Nemours and Company. Suitable carbon black pigments include, without limitation, Cabot pigments such as MONARCH 1400, MONARCH 1300, MONARCH 1100, MONARCH 1000, MONARCH 900, MONARCH 880, MONARCH 800, MONARCH 700, CAB-O-JET 200, CAB-O-JET 300, REGAL, BLACK PEARLS, ELFTEX, MOGUL, and VULCAN pigments; Columbian pigments such as RAVEN 5000, and RAVEN 3500; Evonik pigments such as Color Black FW 200, FW 2, FW 2V, FW 1, FW18, FW S160, FW S170, Special Black 6, Special Black 5, Special Black 4A, Special Black 4, PRINTEX U, PRINTEX 140U, PRINTEX V, and PRINTEX 140V. The above list of pigments includes unmodified pigment particulates, small molecule attached pigment particulates, and polymer-dispersed pigment particulates. Other pigments can also be selected, as well as mixtures thereof. The pigment particle size is desired to be as small as possible to enable a stable colloidal suspension of the particles in the liquid vehicle and to prevent clogging of the ink channels when the ink is used in a thermal ink jet printer or a piezoelectric ink jet printer.

The inks disclosed may also contain a surfactant. Examples of suitable surfactants include ionic surfactants, anionic surfactants, cationic surfactants, nonionic surfactants, zwitterionic surfactants, and the like, as well as mixtures thereof. Examples of suitable surfactants include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone copolyols, substituted amine oxides, and the like, with specific examples including primary, secondary, and tertiary amine salt compounds such as hydrochloric acid salts, acetic acid salts of laurylamine, coconut amine, stearylamine, rosin amine; quaternary ammonium salt type compounds such as lauryltrimethylammonium chloride, cetyltrimethylammonium chloride, benzyltributylammonium chloride, benzalkonium chloride, etc.; pyridinium salty type compounds such as cetylpyridinium chloride, cetylpyridinium bromide, etc.; nonionic surfactant such as polyoxyethylene alkyl ethers, polyoxyethylene alkyl esters, acetylene alcohols, acetylene glycols; and other surfactants such as 2-heptadecenyl-hydroxyethylimidazoline, dihydroxyethylstearylamine, stearyldimethylbetaine, and lauryldihydroxyethylbetaine; fluorosurfactants; and the like, as well as mixtures thereof. Additional examples of nonionic surfactants include polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™ IGEPAL CA-520™, IGEPAL CA-720™, IGEPAL CO-890™, IGEPAL C0-720™, IGEPAL C029™, IGEPAL CA-210™, ANTAROX 890™, and ANTAROX 897™. Other examples of suitable nonionic surfactants include a block copolymer of polyethylene oxide and polypropylene oxide, including those commercially available as SYNPERONIC™ PE/F, such as SYNPERONIC™ PE/F 108. Other examples of suitable anionic surfactants include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abietic acid available from Sigma-Aldrich, NEOGEN R™ NEOGEN SC™ available from Daiichi Kogyo Seiyaku, combinations thereof, and the like. Other examples of suitable anionic surfactants include DOWFAX™ 2A1, an alkyldiphenyloxide disulfonate from Dow Chemical Company, and/or TAYCA POWER BN2060 from Tayca Corporation (Japan), which are branched sodium dodecyl benzene sulfonates. Other examples of suitable cationic surfactants, which are usually positively charged, include alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, C 12, C15, C17 trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, as well as mixtures thereof. Mixtures of any two or more surfactants can be used.

The optional surfactant can be present in any desired or effective amount. In embodiments, the surfactant is present in an amount of from about 0.01 to about 5 percent by weight, based on the total weight of the ink composition. It should be noted that the surfactants are named as dispersants in some cases.

In embodiments, the colorant may be included in the curable aqueous latex ink in an amount of, for example, about 0.1 to about 35%, or from about 1 to about 15%, or from about 3 to about 10% by weight of the curable aqueous latex ink.

Ink Composition Preparation and Use

The ink compositions can be prepared by any suitable process, such as by simple mixing of the ingredients. One process entails mixing all of the ink ingredients together and filtering the mixture to obtain an ink. Inks can be prepared by mixing the ingredients, heating if desired, and filtering, followed by adding any desired additional additives to the mixture and mixing at room temperature with moderate shaking until a homogeneous mixture is obtained, in embodiments from about 5 to about 10 minutes. Alternatively, the optional ink additives can be mixed with the other ink ingredients during the ink preparation process, which takes place according to any desired procedure, such as by mixing all the ingredients, heating if desired, and filtering.

In a specific embodiment, the inks are prepared as follows: 1) preparation of a latex optionally stabilized with a surfactant; 2) preparation of a dispersion of a colorant optionally stabilized with a surfactant; 3) mixing of the latex with the colorant dispersion; 4) optional filtering of the mixture; 5) addition of other components such as water, co-solvents, monomers and/or oligomers, photoinitiators and optional additives; and 6) optional filtering of the composition.

Further examples of ink preparation methods are set forth in the Examples below.

The ink compositions described herein may be jetted at temperatures of less than about 70° C., such as from about 25° C. to about 70° C., or from about 30° C. to about 50° C., or from about 30° C. to about 40° C. The ink compositions are thus ideally suited for use in piezoelectric ink jet devices.

The ink compositions can be employed in indirect (offset) printing ink-jet applications, wherein droplets of the aqueous curable latex ink are ejected in an imagewise pattern onto a recording substrate, the recording substrate is an intermediate-transfer member and the ink in the imagewise pattern is subsequently transferred from the intermediate-transfer member to a final recording substrate.

In a specific embodiment, a process herein comprises incorporating an ink prepared as disclosed herein into an ink jet printing apparatus, ejecting ink droplets in an imagewise pattern onto an intermediate transfer member, heating the image to partially or completely remove solvents, optionally partially curing and transferring the ink in the imagewise pattern from the intermediate transfer member to a final recording substrate, followed by complete curing to form a robust image. In a specific embodiment, the intermediate transfer member is heated to a temperature above that of the final recording sheet and below that of the ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

The intermediate-transfer member may take any suitable form, such as a drum or belt.

Once upon the intermediate-transfer member surface, the jetted ink composition may be exposed to radiation to a limited extent (i.e., partially cured) so as to effect a limited curing of the ink upon the intermediate-transfer member surface. This intermediate curing is not to cure the ink composition to its full extent, but merely to assist in setting the jetted ink so that it may be transferred to the image receiving substrate with minimal splitting, which requires the ink droplets to have a certain viscosity before transfer. For controlling the extent of the curing if an intermediate cure is practiced, reference is made to Co-pending application Ser. Nos. 11/034,850 and 11/005,991, each incorporated herein by reference. This intermediate-curing step is not necessary in embodiments in which the intermediate state is sufficient to impart the desired viscosity to the ink droplets.

Following jetting to the intermediate-transfer member and optional intermediate curing thereon, the ink composition is thereafter transferred to an image receiving substrate. The substrate may be any suitable material such as paper, non-porous flexible food packaging substrates, adhesives for food packaging paper, foil-laminating fabric, plastic, glass, metal, etc. Following transfer to the substrate, the ink composition is then cured by exposing the image on the substrate to radiation. For example, radiation having an appropriate wavelength, mainly the wavelength at which the ink initiator absorbs radiation, may be used. This initiates the curing reaction of the ink composition. The radiation exposure need not be long, and may occur for example, about 0.05 to about 10 seconds, such as from about 0.2 to about 2 seconds. These exposure times are more often expressed as substrate speeds of the ink composition passing under a UV lamp. For example, the microwave energized, doped mercury bulbs available from UV Fusion are placed in an elliptical mirror assembly that is 10 cm wide; multiple units may be placed in series. Thus, a belt speed of 0.1 ms-1 would require 1 second for a point on an image to pass under a single unit, while a belt speed 4.0 ms-1 would require 0.2 seconds to pass under four bulb assemblies. The energy source used to initiate crosslinking of the radiation curable components of the composition can be actinic, for example, radiation having a wavelength in the ultraviolet or visible region of the spectrum, accelerated particles, for example, electron beam radiation, thermal, for example, heat or infrared radiation, or the like. In embodiments, the energy is actinic radiation because such energy provides excellent control over the initiation and rate of crosslinking. Suitable sources of actinic radiation include mercury lamps, xenon lamps, carbon arc lamps, tungsten filament lamps, lasers, light emitting diodes, sunlight, electron beam emitters and the like. The curing light may be filtered, if desired or necessary. The curable components of the ink composition react to from a cured or cross-linked network of appropriate hardness. In embodiments, the curing is substantially complete to complete, i.e., at least 75% of the curable components are cured (reacted and/or cross-linked). This allows the ink composition to be substantially hardened, and thereby to be much more scratch resistant.

Transfer from the intermediate-transfer member to the final recording substrate can be made by any desired or suitable method, such as by passing the final recording substrate through a nip formed by the intermediate-transfer member and a back member, which can be of any desired or effective configuration, such as a drum or roller, a belt or web, a flat surface or platen, or the like. Transfer can be carried out at any desired or effective nip pressure, for example from about 5 pounds per square inch to about 2,000 pounds per square inch, such as from about 10 to about 200 pounds per square inch. The transfer surface may be hard or soft and compliant. Subsequent to transfer, the image on the substrate is cured. The radiation to cure the photo-polymerizable components of the ink composition may be provided by a variety of possible techniques, including but not limited to a xenon lamp, laser light, medium pressure mercury lamps, micro-wave excited mercury lamps often known as a H bulb, doped mercury lamps often referred to as D or V bulbs, LED etc. It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art, and are also intended to be encompassed by the following claims.

While the description above refers to particular embodiments, it will be understood that many modifications may be made without departing from the spirit thereof. The accompanying claims are intended to cover such modifications as would fall within the true scope and spirit of embodiments herein.

The presently disclosed embodiments are, therefore, to be considered in all respects as illustrative and not restrictive, the scope of embodiments being indicated by the appended claims rather than the foregoing description. All changes that come within the meaning of and range of equivalency of the claims are intended to be embraced therein.

EXAMPLES

The examples set forth herein below and are illustrative of different compositions and conditions that can be used in practicing the present embodiments. All proportions are by weight unless otherwise indicated. It will be apparent, however, that the present embodiments can be practiced with many types of compositions and can have many different uses in accordance with the disclosure above and as pointed out hereinafter.

Example 1

Amorphous Polyester Dispersion 190 grams of poly(co-propoxylated bisphenol co-terephthalate co-fumarate polyester resin were weighed out in a 1 Liter kettle. 100 grams of methyl ethyl ketone (MEK) and 40 grams of isopropanol (IPA) were weighed out separately and mixed together in a beaker. The solvents were poured into the 1 Liter kettle containing the resin. The kettle, with its cover on, a gasket, a condenser and 2 rubber stoppers, was placed inside a water bath set at 48° C. for 1 hour until the resins became "soft". The anchor blade impeller was set up in the kettle and is switched on to rotate at approximately 150 revolutions per minute (rpm). After 3 hours, when all of the resins had dissolved, 8.69 grams of 10% NH$_4$OH was added to the mixture drop-wise with a disposable pipette through a rubber stopper. The mixture was left to stir for 10 minutes. 600 grams of de-ionized water (DIW) was added into the kettle by a pump through a rubber stopper. The first 400 grams were added in 90 minutes with the pump set to a rate of 4.44 grams/minute. The last 200 grams were added in 30 minutes with the pump set to 6.7 grams/minute. The apparatus was dismantled, and the mixture was poured into a glass pan, which was kept in the fume hood overnight and stirred by a magnetic stir-bar so that the solvent could evaporate off. The particle size as measured by a NiComp Particle Analyzer was 170 nanometers.

Example 2

Crystalline Polyester Dispersion

A crystalline polyester dispersion was prepared as in Example 1 except that poly(1,9-nonanediol-co-dodecanedioic acid), a crystalline polyester, was used in place of the amorphous polyester.

Example 3

Prophetic Example

Ink Formulation A

To a 100 mL amber glass bottle, is added SR550, Irgacure 500, Lucirin TPO-L, Irgastab UV10, BYK 347 surfactant and carbon black dispersion. While the mixture is stirred with a magnetic stir bar at 200 RPM, water (~20% to wash latex beaker) is slowly added. The pH of the latex is separately adjusted to 6.8 and then is slowly added to vial which is chased with 20% water to clean latex residuals. The ink is then homogenized for 5 minutes at 2,000 RPM. Table 1 below shows the components of Ink Formulation A.

TABLE 1

| Component | Function | wt % | m (g) |
|---|---|---|---|
| poly(co-propoxylated bisphenol co-terephthalate co-fumarate latex | amorphous latex | 22.2 | 11.1 |
| poly(1,9-nonanediol-co-dodecanedioic acid) | crystalline polyester latex | 5.6 | 2.8 |
| sulfalone (5% water) | humectant | 16.7 | 8.4 |
| 2-pyrrolidinone | humectant | 3.3 | 1.65 |
| PEO (Mw 20k) | viscosity modifier | 0.7 | 0.35 |
| Carbon black 300 (14.9% pigment) | pigment dispersion | 22.2 | 11.1 |
| BYK 347 | silicone surfactant | 0.16 | 0.08 |
| SR550 | monomer | 10 | 5 |
| Irgacure 500 | photoinitiator | 0.3 | 0.15 |
| Lucirin TPO-L | photoinitiator | 0.05 | 0.025 |
| Irgastab UV10 | UV stabilizer | 0.02 | 0.01 |
| water | solvent | 18.8 | 9.4 |
| TOTAL | | 100 | |

Based on previous data disclosed in U.S. patent application Ser. No. 14/066,716 entitled "INK JET INK FOR INDIRECT PRINTING APPLICATIONS" to J. Eliyahu et al., electronically filed on the same day herewith and U.S. patent application Ser. No. 14/067,469 entitled "INKJET INK CONTAINING POLYSTYRENE COPOLYMER LATEX SUITABLE FOR INDIRECT PRINTING" to J. Eliyahu et al., electronically filed on the same day herewith and known monomer properties, prophetic ink formulation A is predicted to demonstrate suitable viscosity (5-20 cps) and surface tension (20-22 mN/m) for jetting.

Formulation A is applied via inkjet 1 (see, FIG. 1) onto an intermediate receiving member 5 (e.g., a drum) having a higher surface energy than the liquid ink surface tension. The jetted image is heated by a heater device 3 to remove water and induce film formation by the latex and monomers/oligomers. The film is optionally pre-cured by UV radiation source 4 to reduce film splitting as required followed by transfer to the substrate 5 through contact under pressure and near the softening point of the latex-ink film. The transferred image is further subjected to UV irradiation 6 to induce complete crosslinking thereby resulting in an extremely robust image.

Image robustness is especially important for packaging applications such as folding carton.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others. Unless specifically recited in a claim, steps or components of claims should not be implied or imported from the specification or any other claims as to any particular order, number, position, size, shape, angle, color, or material.

All the patents and applications referred to herein are hereby specifically, and totally incorporated herein by reference in their entirety in the instant specification.

What is claimed is:

1. A curable aqueous latex ink for use in an indirect printing process comprising:
    a curable material;
    a photoinitiator; and
    a polymer comprises poly(propoxylated bisphenol-co-terephthalate-co-fumarate) and poly(1,9-nonanediol-co-dodecanedioic acid), wherein the polymer has a softening temperature of from about 40° C. to less than 105° C., and a glass transition temperature of from about 40° C. to about 150° C.;
wherein the ink has an average particle size of from about 50 nm to about 300 nm.

2. The ink of claim 1, wherein the curable material is selected from the group consisting of a curable monomer, a curable oligomer, and mixtures thereof.

3. The ink of claim 2, wherein the curable monomer is selected from the group consisting of methacrylate monomer, acrylate monomer, dimethacrylate monomer, diacrylate monomer, triacrylate monomer, and mixtures thereof.

4. The ink of claim 2, wherein the curable oligomer is selected from the group consisting of diacrylate oligomer, polyester acrylate oligomer, and mixtures thereof.

5. The ink of claim 1, wherein the curable material is present in an amount of about 1 to about 30 weight percent based on the total weight of the ink.

6. The ink of claim 1, wherein the polymer comprises an amorphous polyester, a crystalline polyester, or mixtures thereof.

7. The ink of claim 1, wherein the polymer has a weight average molecular weight of from about 5,000 g/mol to about 40,000 g/mol.

8. The ink of claim 1, wherein the polymer has a volume average particle size of from about 50 nm to about 600 nm.

9. The ink of claim 1, wherein the polymer is present in an amount of from about 1 weight percent to about 20 weight percent based on the total weight of the ink.

10. The ink of claim 1, wherein the photoinitiator is selected from the group consisting of hydroxyketones, benzophenone, acyl phosphine oxides, phenylglyoxylates, and mixtures thereof.

11. The ink of claim 1, wherein the ink further comprises a colorant selected from the group consisting of pigment, dye, mixtures of pigment and dye, mixtures of pigments, and mixtures of dyes.

12. The ink of claim 1, wherein the ink has a surface tension of from about 15 to about 50 dynes/cm at the jetting temperature.

13. The ink of claim 1, wherein the ink has a viscosity of from about 2 centipoise to about 20 centipoise at the jetting temperature.

* * * * *